United States Patent
Lairsey et al.

(10) Patent No.: US 12,001,276 B2
(45) Date of Patent: *Jun. 4, 2024

(54) SYSTEM FOR EFFICIENT ENTERPRISE DISPATCHING

(71) Applicant: Dell Products L.P., Round Rock, TX (US)

(72) Inventors: Jeffrey M. Lairsey, Round Rock, TX (US); Saurav Shrestha, Round Rock, TX (US); Margaret Patton, Austin, TX (US); Carlin Mendonca, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,796

(22) Filed: Mar. 22, 2021

(65) Prior Publication Data

US 2022/0300368 A1  Sep. 22, 2022

(51) Int. Cl.
*G06F 11/00* (2006.01)
*G06F 9/48* (2006.01)
*G06F 11/07* (2006.01)
*G06F 11/30* (2006.01)

(52) U.S. Cl.
CPC ........ *G06F 11/0793* (2013.01); *G06F 9/4881* (2013.01); *G06F 11/3006* (2013.01)

(58) Field of Classification Search
CPC .. G06F 11/0793; G06F 11/3006; G06F 11/30; G06F 11/03

See application file for complete search history.

(56) References Cited

U.S. PATENT DOCUMENTS

| | | |
|---|---|---|
| 7,310,671 B1 | 12/2007 | Hassell et al. |
| 9,148,349 B1 | 9/2015 | Burr et al. |
| 9,471,594 B1 | 10/2016 | Schnegelberger |
| 9,785,497 B1 | 10/2017 | Cook et al. |
| 10,530,935 B1 | 1/2020 | Britt et al. |
| 10,616,072 B1 | 4/2020 | Lo et al. |
| 10,715,522 B2 | 7/2020 | Lew |

(Continued)

OTHER PUBLICATIONS

Daniel McDuff et al., AFFDEX SDK: A Cross-Platform Real-Time Multi-Face Expression Recognition Toolkit, Publication: CHI EA '16: Proceedings of the 2016 CHI Conference Extended Abstracts on Human Factors in Computing Systems, pp. 3723-3726, May 2016, https://doi.org/10.1145/2851581.2890247.

(Continued)

*Primary Examiner* — Katherine Lin
(74) *Attorney, Agent, or Firm* — Terrile, Cannatti & Chambers, LLP; Stephen A. Terrile

(57) ABSTRACT

A system, method, and computer-readable medium for performing a data center monitoring and management operation. The data center monitoring and management operation includes: monitoring data center assets within a data center; identifying an issue within the data center, the issue being associated with an operational situation associated with a particular component of the data center; generating a remediation task via a data center monitoring and management application, the remediation task being designed to address the issue within the data center; and, performing a data center remediation operation based upon the remediation task.

20 Claims, 6 Drawing Sheets

(56) References Cited

U.S. PATENT DOCUMENTS

| | | |
|---|---|---|
| 10,819,556 B1 | 10/2020 | Rangasamy et al. |
| 11,074,730 B1 | 7/2021 | Nunez |
| 2006/0010497 A1 | 1/2006 | O'Brien |
| 2006/0129670 A1 | 6/2006 | Mayer |
| 2010/0313145 A1 | 12/2010 | Dillenberger et al. |
| 2011/0160987 A1 | 6/2011 | Wu et al. |
| 2011/0258143 A1 | 10/2011 | Hilkemeyer et al. |
| 2012/0249588 A1 | 10/2012 | Tison et al. |
| 2013/0031202 A1 | 1/2013 | Mick et al. |
| 2013/0346786 A1* | 12/2013 | Thiel .................. G06F 11/0754 714/2 |
| 2014/0006762 A1 | 1/2014 | Bittner et al. |
| 2015/0019705 A1 | 1/2015 | Suryanarayanan et al. |
| 2015/0032887 A1 | 1/2015 | Pesek et al. |
| 2015/0095988 A1 | 4/2015 | Hirakata et al. |
| 2017/0034200 A1 | 2/2017 | Costin et al. |
| 2017/0091607 A1 | 3/2017 | Emeis et al. |
| 2017/0098087 A1 | 4/2017 | Li |
| 2017/0269617 A1 | 9/2017 | Daoud et al. |
| 2017/0269983 A1 | 9/2017 | Liu et al. |
| 2017/0299633 A1 | 10/2017 | Pietrowicz et al. |
| 2017/0330096 A1 | 11/2017 | Das Gupta et al. |
| 2018/0007060 A1 | 1/2018 | Leblang |
| 2018/0032736 A1 | 2/2018 | Inagaki et al. |
| 2018/0108022 A1 | 4/2018 | Bandera et al. |
| 2018/0285750 A1 | 10/2018 | Purushothaman et al. |
| 2018/0337907 A1 | 11/2018 | Bhansali |
| 2019/0035407 A1 | 1/2019 | Keret et al. |
| 2019/0073276 A1* | 3/2019 | Yuen .................. G06F 11/302 |
| 2019/0158366 A1 | 5/2019 | Higgins et al. |
| 2019/0213306 A1 | 7/2019 | Caselles |
| 2019/0236844 A1 | 8/2019 | Balasian et al. |
| 2019/0394206 A1 | 12/2019 | Zezza |
| 2020/0026871 A1 | 1/2020 | Mikhailov et al. |
| 2020/0050861 A1 | 2/2020 | Wexler et al. |
| 2020/0117529 A1 | 4/2020 | Qiao et al. |
| 2020/0117898 A1 | 4/2020 | Tian et al. |
| 2020/0167712 A1 | 5/2020 | Stracquatanio et al. |
| 2020/0169509 A1 | 5/2020 | Tigli |
| 2020/0175165 A1 | 6/2020 | Murphy et al. |
| 2020/0250430 A1 | 8/2020 | Kishore et al. |
| 2020/0250863 A1 | 8/2020 | Shetty et al. |
| 2020/0252276 A1 | 8/2020 | Lairsey et al. |
| 2020/0253079 A1 | 8/2020 | Lairsey et al. |
| 2020/0278901 A1 | 9/2020 | Singh et al. |
| 2020/0329214 A1 | 10/2020 | Ahn et al. |
| 2020/0366671 A1 | 11/2020 | Larson |
| 2021/0019423 A1 | 1/2021 | DuBois et al. |
| 2021/0084119 A1 | 3/2021 | Sheikh |
| 2021/0097058 A1 | 4/2021 | Skiles et al. |
| 2021/0112145 A1 | 4/2021 | Monga et al. |
| 2021/0397182 A1 | 12/2021 | Dundorf et al. |
| 2022/0070050 A1 | 3/2022 | D'Ippolito et al. |
| 2022/0156162 A1* | 5/2022 | Reyes .................. G06N 20/00 |
| 2022/0172729 A1 | 6/2022 | Mohajer |
| 2022/0199093 A1 | 6/2022 | Ramadas |

OTHER PUBLICATIONS

Brittany Herr et al., Analyzing distributed trace data, Pinterest Engineering Blog, Sep. 29, 2017, https://medium.com/pinterest-engineering/analyzing-distributed-trace-data-6aae58919949.

Pedro Cesar Tebaldi, What IT Infrastructure Remote Monitoring (NOC) is, OPSERVICES (Year: 2017).

* cited by examiner

SYSTEM FOR EFFICIENT ENTERPRISE DISPATCHING

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: monitoring data center assets within a data center; identifying an issue within the data center, the issue being associated with an operational situation associated with a particular component of the data center; generating a remediation task via a data center monitoring and management application, the remediation task being designed to address the issue within the data center; and, performing a data center remediation operation based upon the remediation task.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring data center assets within a data center; identifying an issue within the data center, the issue being associated with an operational situation associated with a particular component of the data center; generating a remediation task via a data center monitoring and management application, the remediation task being designed to address the issue within the data center; and, performing a data center remediation operation based upon the remediation task.

In another embodiment the invention relates to a computer-readable storage medium embodying computer program code, the computer program code comprising computer executable instructions configured for: monitoring data center assets within a data center; identifying an issue within the data center, the issue being associated with an operational situation associated with a particular component of the data center; generating a remediation task via a data center monitoring and management application, the remediation task being designed to address the issue within the data center; and, performing a data center remediation operation based upon the remediation task.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
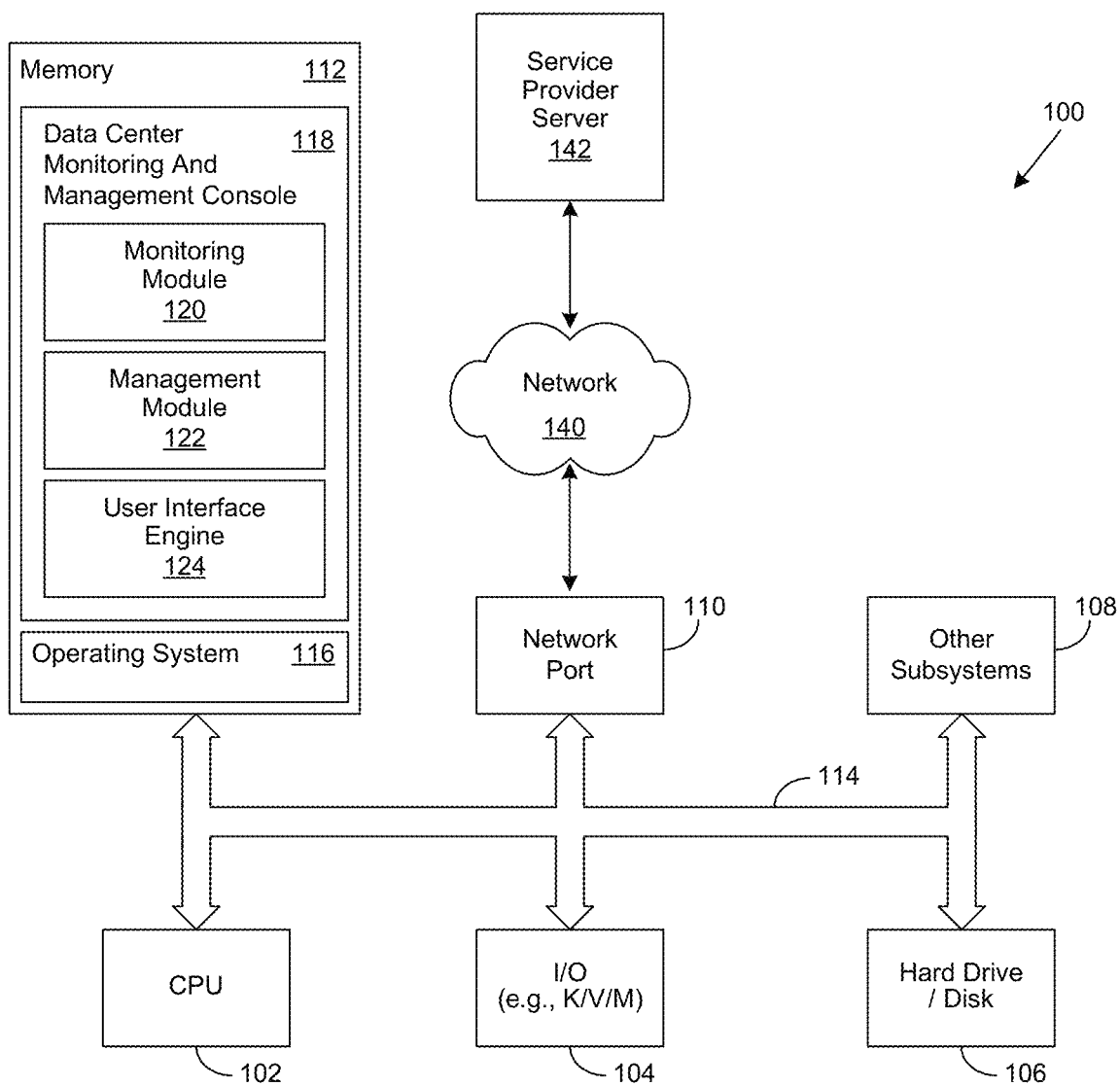
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Various aspects of the invention reflect an appreciation that data center system administrators, beyond their day-to-day monitoring and management duties, often have the additional responsibility of remediating certain data center issues, described in greater detail herein. Certain aspects of the invention likewise reflect an appreciation that the complexity of remediating such data center issues generally grows in proportion to the number of data center assets that are being monitored and managed. Likewise, certain aspects of the invention reflect an appreciation that the more quickly individual data center issues can will likely lead to higher quality of service levels and user satisfaction.

Certain aspects of the invention reflect an appreciation that it is often advantageous for an organization to optimize the utilization of its data center personnel, and other resources, when remediating a data center issue. Certain aspects of the invention reflect that it is not uncommon for an organization to assign its most qualified data center personnel to remediate a particular data center issue in the hope that they will be able to remediate the issue in the shortest time possible. However, certain aspects of the invention likewise reflect an appreciation that such approaches sometimes results in the most qualified data center personnel being assigned to remediate difficult, but low priority, data center issues, and as a result, not being available when a high priority data center issue occurs. Likewise, various aspects of the invention reflect an appreciation that an organization may have a desire to broaden the knowledge, capabilities, and expertise of certain less-experienced data center personnel involved in the remediation of data center issues. Accordingly, certain aspects of the invention reflect an appreciation that an organization may desire to have the most minimally-qualified data center personnel remediate a particular data center issue, based upon its prioritization, or its difficulty, or a combination of the two.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
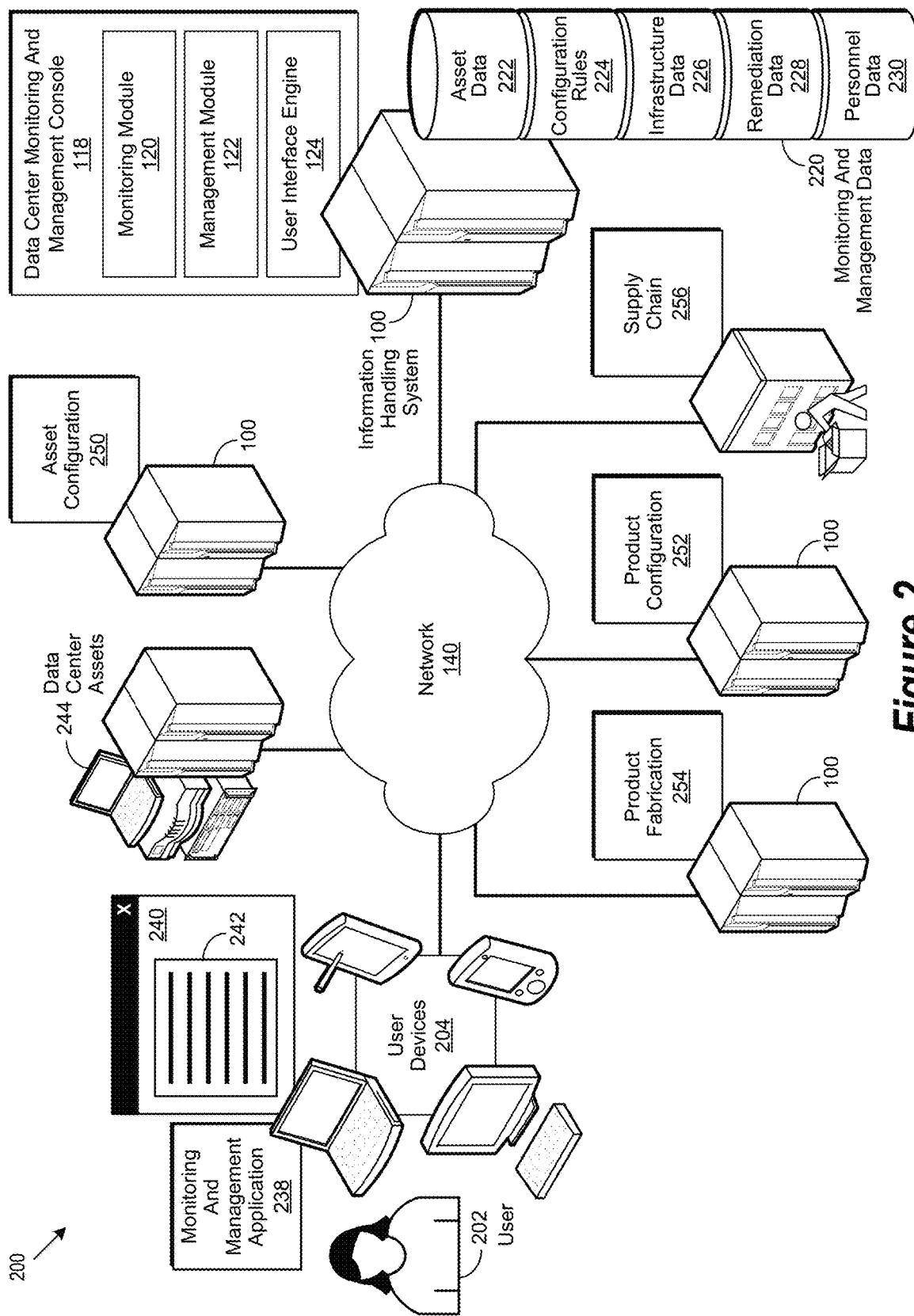
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, operation, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, or a combination of the two. As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, to correct an operational situation associated with a particular component of a data monitoring and management environment 200, which if not corrected, may result in negative consequences.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the selection of such parameters is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, and a user interface (UI) engine 124, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload. In certain embodiments, the data center asset data 224 may include information associated with data center asset 244 types, quantities, locations, use types, optimization types, workloads, performance, support information, and cost factors, or a combination thereof, as described in greater detail herein. In certain embodiments, the data center asset data 224 may include information associated with data center asset 244 utilization patterns, likewise described in greater detail herein.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, the error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. Those of skill in the art will recognize that many such examples of data center remediation data 230 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204. such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain data center remediation resources, described in greater detail herein, that may be needed to perform a particular data center remediation operation. In various embodiments, such facilitation may include using the data center monitoring and management application 238 to view certain documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
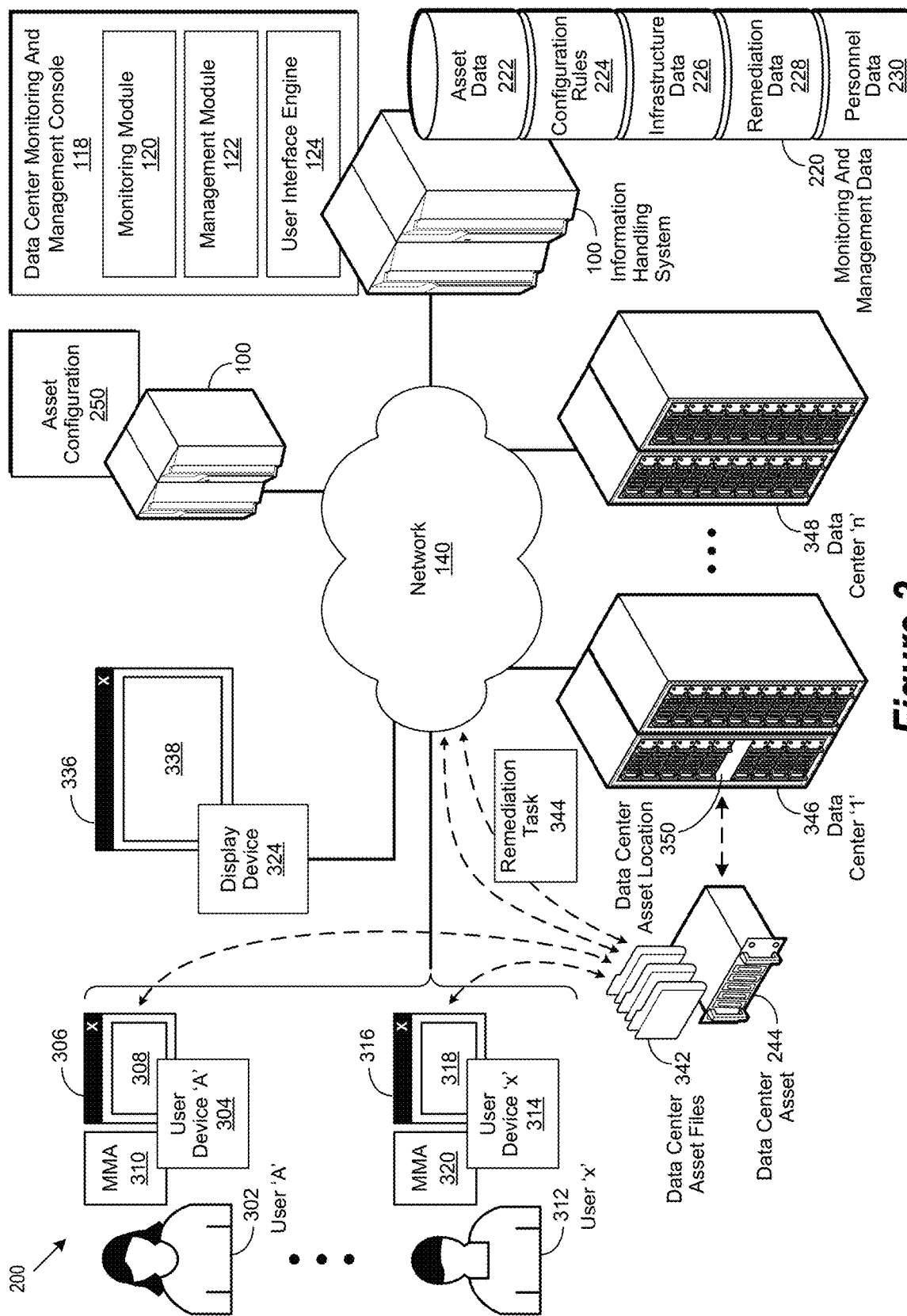
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention likewise reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation 344, described in greater detail herein. In certain embodiments, a data center remediation operation 344 may be performed to remediate a particular data asset 244 issue at a particular data asset location 350 in a particular data center '1' 346 through 'n' 348. In certain embodiments, the data center remediation operation 344 may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, ongoing data center monitoring operations, described in greater detail herein, may be performed to detect certain data center issue alerts, likewise described in greater detail herein. In certain of these embodiments, detection of such an alert may lead to the performance of a preliminary analysis of its associated data center issue to assign it a data center issue priority level and a remediation difficulty level. In certain embodiments, the prioritization and remediation difficulty levels of a particular data center issue may be established by respectively assigning a data center issue priority level value and a corresponding remediation difficulty level value, such as '1', '2', '3', '4', and '5'. As an example, a particular data center issue may be assigned a priority level value of '1', which is the highest priority, and a remediation difficulty level value of '5', which is the lowest difficulty. In these embodiments, the method by which the prioritization level and remediation difficulty level of a data center issue is determined, the method by which such prioritization and difficulty is characterized and notated, and the method by which it is associated with a particular data center issue, is a matter of design choice.

In various embodiments, once the data center issue priority level value and remediation difficulty level value has been associated with its corresponding data center issue, it may then be added to a ranked list of data center issues to be remediated. In certain of these embodiments, individual data center issues may be ranked according to their corresponding data center issue priority level value, their respective remediation difficulty level value, or a combination of the two. In certain embodiments, a particular data center issue may then be selected from the ranked list for remediation, as described in greater detail herein.

In certain embodiments, the data center issue selected for remediation may then be compared to the same, or substantively similar, data center issues that have been successfully remediated in the past to determine possible data center remediation operations to perform. In various embodiments, information associated with such similar, or substantively similar, data center issues, and the data center remediation operation used to successfully remediate them, may be stored in the repository of data center remediation data 228. In certain of these embodiments, the data center remediation operation used to successfully remediate the same, or substantively similar, data center issues in the past may be presented in ranked order of their respective efficacy. As an example, those data center remediation operations that are more likely to remediate a particular data center issue may have a higher ranking than those that are less likely to. In these embodiments, the method by which the efficacy of such data center remediation operations are determined, the method by which they are ranked, and the criteria by which the ranking is determined, is a matter of design choice.

In certain embodiments, one or more such data center remediation operations may then be selected, and once selected, a determination made regarding who and what is needed to perform them. To continue a previous example, a server may have an internal fan that is beginning to fail, and as a result, its operational temperature is beginning to reach an unacceptable level. In this example, the data center remediation operation selected to be performed may involve replacement of the fan. Accordingly, it may be determined that who is needed is any data center personnel that is knowledgeable of how to replace the fan, regardless of whether they have done so in the past, or more particularly, have done so for that particular type or model of server. Likewise, it may be determined that what is needed is a suitable replacement fan, documentation for the fan and server, and step-by-step instructions on how to replace the fan in that particular server.

In various embodiments, a determination may be made regarding who and what is available to perform the selected data center remediation operation. In certain of these embodiments, the information used to make such an availability determination may be stored in the repositories of data center asset data 222, configuration rules 224, infrastructure data 226, remediation data 228, or personnel data 230, or a combination thereof. In certain embodiments, a ranked list of candidate data center personnel to perform the selected data center remediation operation may be generated. In certain embodiments, the list of candidate data center personnel may be ranked according to particular skills, certifications, knowledge, experience, and so forth, they may individually possess that may be relevant to the selected data center remediation operation.

In various embodiments, the list of candidate data center personnel may additionally be ranked according to each individual candidate's current workloads, their currently assigned responsibilities, their success rate in remediating a particular type or class of data center issue, the number of such data center issues they have successfully remediated in the past, the average time it may have taken them to successfully remediate the issue, their physical location, the priority level and remediation difficulty level of the data center issue, and so forth. In various embodiments, the data center monitoring and management console 118 may be implemented to track the physical location of certain data center personnel. In various embodiments, certain Global Positioning System (GPS) approaches familiar to those of skill in the art may be used to perform such tracking.

Various embodiments of the invention reflect an appreciation that an organization may desire broadening the knowledge, capabilities, and expertise of certain less-experienced data center personnel involved in the remediation of data center issues. Accordingly, in certain embodiments, an organization may elect to have the most minimally qualified data center personnel remediate a particular data center issue, based upon its data center issue priority value, or its remediation difficulty value, or a combination of the two. As an example, a particular data center issue may have a data center issue priority level value of '5', indicating that it is of low priority, yet it has a remediation difficulty level value of '1', indicating that it may be very difficult or complicated to remediate. In this example, the data center issue may be considered to be an opportunity for a less-experienced data center administrator or technician to gain knowledge and expertise in resolving a difficult or complicated data center issue without incurring significant risk if its remediation takes longer than anticipated.

As another example, a particular data center issue may have a data center issue priority value of '1', indicating that it is of very high priority, yet it has a remediation difficulty value of '5', indicating that it may be relatively simple to remediate. In this example, the data center issue may be considered to be inappropriate for a less-experienced data center administrator or technician to remediate, as its high priority may indicate that the data center may incur significant risk if it takes too long to remediate. Accordingly, it may make more sense for a more experienced data center administrator or technician to remediate the issue to reduce data center's risk, even though its remediation difficulty may be low.

In certain embodiments, one or more data center personnel may be selected from the ranked list of candidate data center personnel to perform the data center remediation operation. In these embodiments, the method by which the one or more personnel is selected from the ranked list of candidate data center personnel is a matter of design choice. In various embodiments, certain rules-based, pattern matching, or machine learning approaches known to those of skill in the art may be used to make the selection. In these embodiments, the rules-based, pattern matching, or machine learning approaches, or a combination thereof, used to make the selection is a matter of design choice.

In certain embodiments, the availability of the selected data center personnel may next be determined, and if they are not available to perform the data center remediation operation, then a different candidate is selected, as before. In these embodiments, the selection process may be repeated until the availability of the selected data center personnel has been confirmed. In various embodiments, the data center monitoring and management console 118 may be implemented to identify certain documentation, data center asset files 342, and other remediation resources needed to perform the data center remediation operation once it has been determined that selected data center personnel are available.

As used herein, a remediation resource broadly refers to a data center resource, described in greater detail herein, that can be used in the performance of a data center remediation operation, likewise described in greater detail herein.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement parts, data center asset files 242 that may be needed, installation and configuration instructions related to such files, the physical location 350 of the data center asset 244, and so forth. In certain embodiments, the resulting data center remediation operation notes may then be associated with the target data center asset 244 and its corresponding data center asset files 342, or other remediation resources, to generate the remediation task 344. As used herein, a data center remediation task 344 broadly refers to an assignment of one or more data center remediation operations, described in greater detail herein, to one or more users 'A' 302 through 'x' 312.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the selected data center personnel may then receive the remediation task 344 assignment notification. In certain embodiments, data center personnel receiving such a remediation task 344 assignment notification may then review its associated remediation task 344 assignment, review any associated data center remediation operation notes, and retrieve any associated remediation resources needed to perform the remediation task 344. In certain embodiments, the selected data center personnel may update the data center remediation operation notes upon completing the remediation task 344. In various embodiments, certain results and metrics associated with completion of the remediation task 344 may be collected, such as how long the remediation task 344 took to complete, whether any additional data center personnel or data center remediation resources were required, issues encountered when performing the remediation task 344, whether it was successfully completed, and so forth. In certain embodiments, the collected results, metrics, and notes may then be added to a repository of data center remediation data 228.

Figure 4:
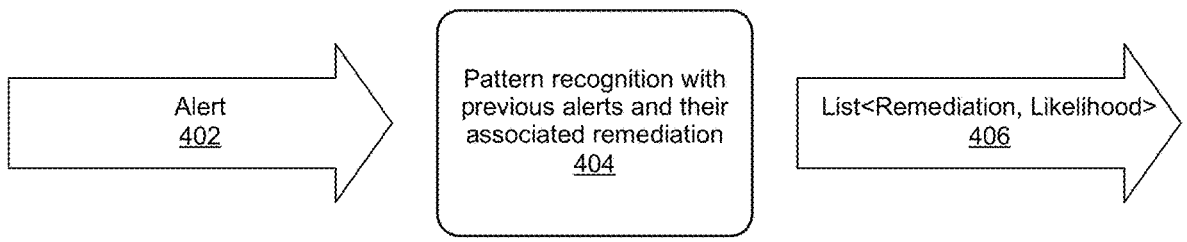
FIG. 4 is a simplified process flow diagram showing the generation of a list of candidate data center remediation operations to remediate a corresponding data center issue.

FIG. 4 is a simplified process flow diagram showing the generation of a list of candidate data center remediation operations implemented in accordance with an embodiment of the invention to remediate a corresponding data center issue. In various embodiments, an alert 402 associated with a particular data center issue, described in greater detail herein, may be processed 404 to generate a list 406 of candidate data center remediation operations, along with their respective success rate, that may have been used to remediate the same, or substantively similar, data center issues in the past. In certain embodiments, the resulting list 406 may likewise be implemented to indicate the likelihood of each candidate data center remediation operation successfully remediating a particular data center issue. In certain embodiments, rules, pattern-matching, or machine learning approaches familiar to those of skill in the art may be used, individually or in combination, to generate the list of candidate data center remediation operations.

Figure 5:
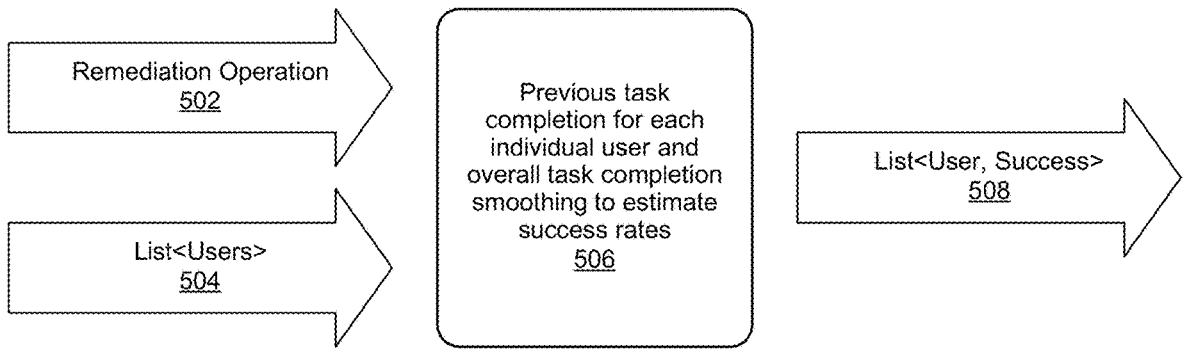
FIG. 5 is a simplified process flow diagram showing the generation of a list of candidate data center personnel to remediate a data center issue.

FIG. 5 shows a simplified diagram of a process flow implemented in accordance with an embodiment of the invention to generate a list of candidate data center personnel to remediate a data center issue. In certain embodiments, as described in greater detail herein, a particular data center remediation operation 502 is compared to a list of available data center personnel 504 to determine which of the data center personnel is most likely to successfully remediate an associated data center issue. As likewise described in greater detail herein, a data center monitoring and management system may be implemented in various embodiments to compare 506 certain attributes of the available data center personnel to certain information associated with the data center issue.

In certain of these embodiments, likewise as described in greater detail herein, the data center monitoring and management system may be implemented to generate a list 508 of candidate data center personnel whose knowledge, skills, expertise, and so forth, most closely match what is most likely needed to remediate the data center issue. In certain embodiments, the list of candidate data center personnel may be ranked according to how closely their knowledge, skills, expertise, and so forth, match what is most likely needed to remediate the data center issue. In certain embodiments, the resulting list of candidate data center personnel may be ranked according to their historical success rate in remediating the same, or substantively similar, data center issues. In certain embodiments, the resulting list of candidate data center personnel may be ranked according to who would be most likely to successfully remediate the data center issue.

Figure 6:
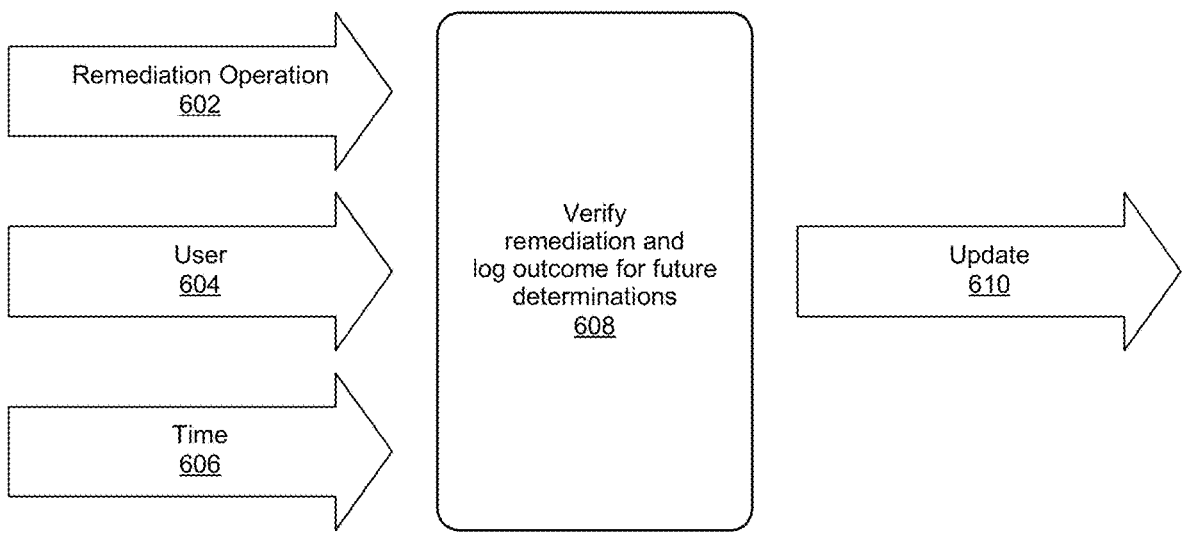
FIG. 6 is a simplified process flow diagram showing the generation of updated data center remediation operation information.

FIG. 6 shows a simplified diagram of a process flow implemented in accordance with an embodiment of the invention to generate updated data center remediation information. In certain embodiments, information associated with a data center remediation operation 602, the data center personnel 604 who performed it, and the time 606 it took to perform it, is processed 608, as described in greater detail herein, to generate updated data center remediation operation information 610. In certain embodiments, as likewise described in greater detail herein, the updated data center remediation information 610 may be stored in a repository of data center remediation data, or a repository of data center personnel data, or a repository of data center asset data, or a combination thereof.

Figure 7A:
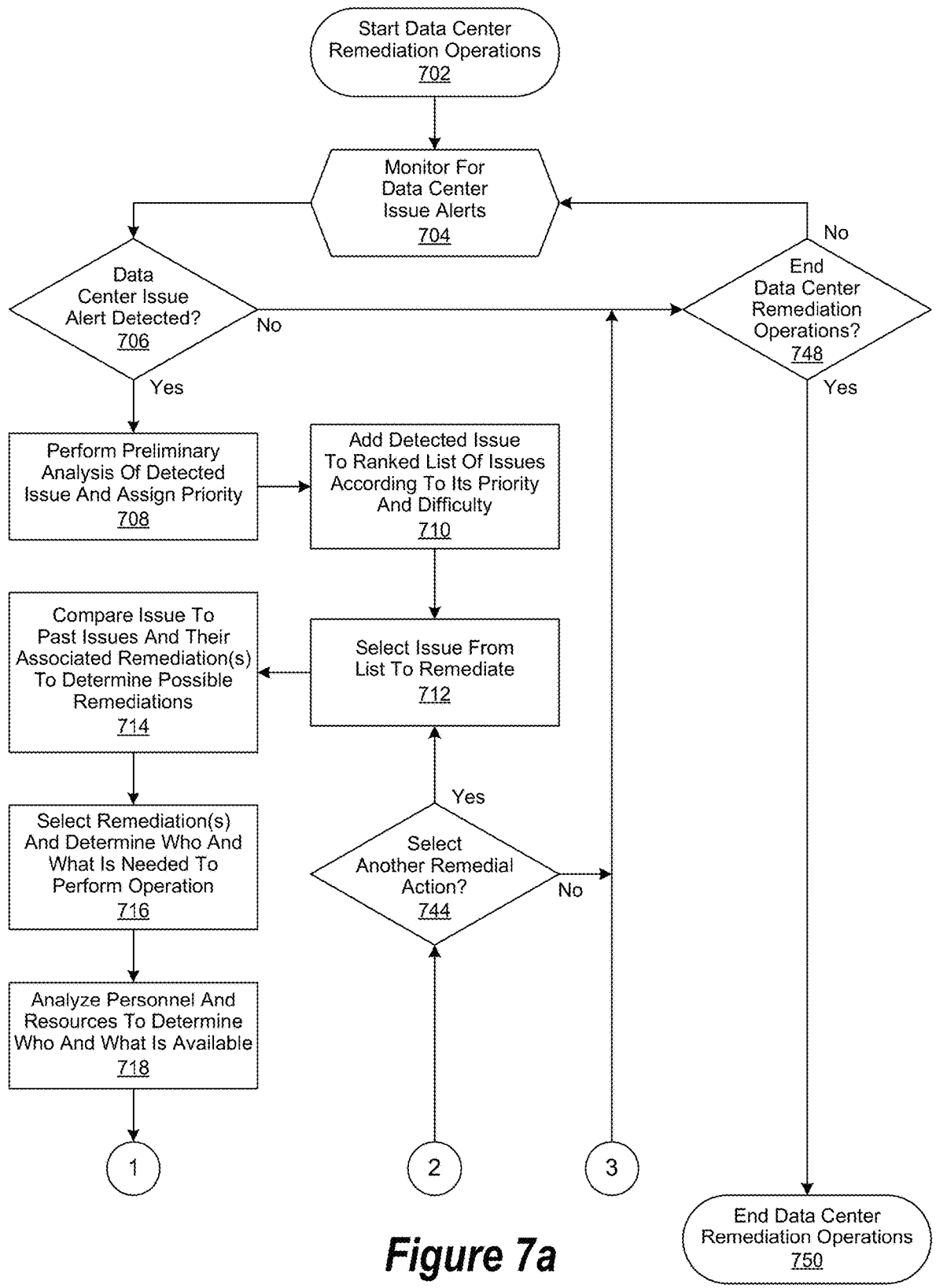
FIGS. 7a and 7b show a flowchart of the performance of data center remediation operations.
Figure 7B:
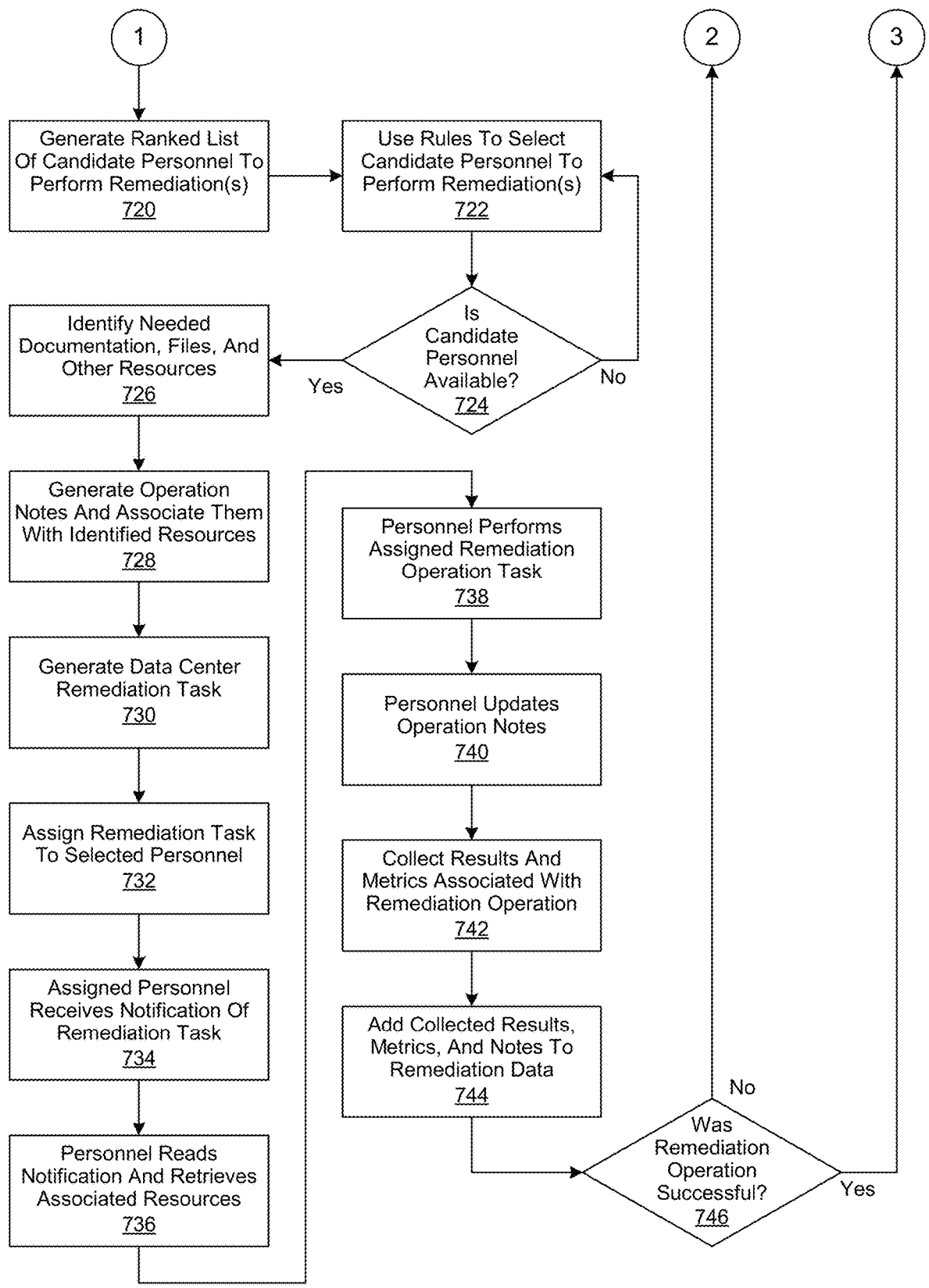

FIGS. 7a and 7b show a flowchart of the performance of data center remediation operations implemented in accordance with an embodiment of the invention. In this embodiment, data center remediation operations are begun in step 702, followed by ongoing data center monitoring operations being performed in step 704 to detect data center issue alerts. A determination is then made in step 706 whether a data center issue alert has been detected. If not, a determination is made in step 748 whether to end data center remediation operations. If not, then the process is continued, proceeding with step 704. Otherwise, data center remediation operations are ended in step 750.

However, if it was determined in step 706 that a data center issue alert was detected, then a preliminary analysis of the detected issue is performed in step 708 and it is assigned a priority value and a remediation difficulty value, such as '1', '2', '3', '4', and '5', where a value of '1' is the highest priority and a value of '5' is the lowest. The detected issue is then added to a ranked list of detected data center issues according to its priority value and remediation difficulty value in step 710, followed by the selection of a data center issue to remediated from the list in step 712. The selected issue is then compared in step 714 to the same, or substantively similar, issues that have been remediated in the past to determine possible data center remediation operations to perform. One or more candidate data center remediation operations are then selected in step 716, along with determining who and what is needed to perform them. Then, in step 718, data center personnel and data center remediation resources are analyzed, as described in greater detail herein, to determine who and what is available to perform the selected data center remediation operation(s).

A ranked list of candidate data center personnel to perform the selected data center remediation operation(s) is then generated in step 720. Rules are then used in step 722, as described in greater detail herein, to select candidate data center personnel to perform the selected data center remediation operation(s). A determination is then made in step 724 whether the candidate personnel are available. If not, then the process is continued, proceeding with step 722.

Otherwise, documentation, data center asset files, and other data center remediation resources needed to perform the selected data center remediation operation(s) is then identified in step 726. Thereafter, data center remediation operation notes, described in greater detail herein, are prepared in step 728 and associated with the previously-identified data center remediation resources needed to perform the selected data center remediation operation(s). The data center remediation operation notes, and associated data center remediation resources, are then processed in step 730 to generate a data center remediation operation task, which is then assigned to the previously-selected data center personnel in step 732.

The assigned data center personnel then receives notification of the data center remediation operation task in step 734. Then, is step 736, the assigned data center personnel reads the notification and its associated data center remediation task and data center remediation operation notes, and retrieves any associated data center remediation resources. The assigned data center personnel then performs the assigned data center remediation operation in step 738, followed by updating its associated data center remediation operation notes in step 740.

The results of performing the data center remediation operation are collected in step 742, along with certain data center remediation operation metrics, described in greater detail herein. The collected results, metrics, and notes are then added to a repository of data center remediation data in step 744, followed by a determination being made in step 746 whether the data center remediation operation was successful. If not, then the process is continued, proceeding with step 744. Otherwise, the process is continued, proceeding with step 748.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    monitoring a plurality of data center assets within a data center via a data center monitoring and management console, the data center monitoring and management console including a monitoring module, a management module and a user interface engine, the monitoring module being implemented to monitor procurement, deployment, implementation, operation, management, maintenance, or remediation of a particular data center asset at any point in a lifecycle of the data center asset, the management module being implemented to manage procurement, deployment, implementation, operation, monitoring, maintenance, or remediation of the particular data center asset at any point in the lifecycle of the data center asset, the user interface engine being implemented to generate a user interface for the provision, or receipt, of information associated with the monitoring, or management, of the particular data center asset;
    identifying an issue within the data center, the issue being associated with an operational situation associated with a particular component of a data center asset of the data center;
    generating a remediation task via a data center monitoring and management application executing on the data center monitoring and management console, the remediation task being designed to address the issue within the data center, the remediation task comprising an assignment of a data center remediation operation to a selected data center personnel, the selected data center personnel being selected from a set of available data center personnel, the selected data center personnel being the data center personnel most likely to remediate the issue; and,
    performing the data center remediation operation based upon the remediation task, the data center remediation operation being performed by the selected data center personnel.

2. The method of claim 1, further comprising:
    generating a remediation task priority queue, the remediation task priority queue comprising a plurality of remediation tasks, the remediation task priority queue taking into account at least one of a remediation prioritization and a remediation difficulty.

3. The method of claim 2, further comprising:
    analyzing the set of available data center personnel;
    comparing attributes of the available data center personnel to information associated with the issue; and,
    assigning each of the plurality of remediation tasks to at least one of the available data center personnel based upon the comparing attributes of the available data center personnel, the assigning generating an assignment for the at least one of the available data center personnel.

4. The method of claim 3, further comprising:
    notifying the at least one of the available data center personnel about the assignment; and,
    providing a remediation resource regarding the assignment to the at least one of the available data center personnel.

5. The method of claim 1, wherein:
    the remediation task comprises a solution to address the issue; and,
    the solution is distributed to an available data center personnel via the data center monitoring and management application.

6. The method of claim 5, wherein:
    the data center monitoring and management application facilitates resolution of the data center issue.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        monitoring a plurality of data center assets within a data center via a data center monitoring and management console, the data center monitoring and management console including a monitoring module, a management module and a user interface engine, the monitoring module being implemented to monitor procurement, deployment, implementation, operation, management, maintenance, or remediation of a particular data center asset at any point in a lifecycle of the data center asset, the management module being implemented to manage procurement, deployment, implementation, operation, monitoring, maintenance, or remediation of the particular data center asset at any point in the lifecycle of the data center asset, the user interface engine being implemented to generate a user interface for the provision, or receipt, of information associated with the monitoring, or management, of the particular data center asset;
        identifying an issue within the data center, the issue being associated with an operational situation associated with a particular component of a data center asset of the data center;
        generating a remediation task via a data center monitoring and management application executing on the data center monitoring and management console, the remediation task being designed to address the issue within the data center, the remediation task comprising an assignment of a data center remediation operation to a selected data center personnel, the selected data center personnel being selected from a set of available data center personnel, the selected data center personnel being the data center personnel most likely to remediate the issue; and,
performing the data center remediation operation based upon the remediation task, the data center remediation operation being performed by the selected data center personnel.

8. The system of claim 7, wherein the instructions executable by the processor are further configured for:
generating a remediation task priority queue, the remediation task priority queue comprising a plurality of remediation tasks, the remediation task priority queue taking into account at least one of a remediation prioritization and a remediation difficulty.

9. The system of claim 8, wherein the instructions executable by the processor are further configured for:
analyzing the set of available data center personnel;
comparing attributes of the available data center personnel to information associated with the issue; and,
assigning each of the plurality of remediation tasks to at least one of the available data center personnel based upon the comparing attributes of the available data center personnel, the assigning generating an assignment for the at least one of the available data center personnel.

10. The system of claim 9, wherein the instructions executable by the processor are further configured for:
notifying the at least one of the available data center personnel about the assignment; and,
providing a remediation resource regarding the assignment to the at least one of the available data center personnel.

11. The system of claim 7, wherein:
the remediation task comprises a solution to address the issue; and,
the solution is distributed to an available data center personnel via the data center monitoring and management application.

12. The system of claim 11, wherein:
the data center monitoring and management application facilitates resolution of the data center issue.

13. A non-transitory, computer-readable storage medium embodying computer program code, the computer program code comprising computer executable instructions configured for:
monitoring a plurality of data center assets within a data center via a data center monitoring and management console, the data center monitoring and management console including a monitoring module, a management module and a user interface engine, the monitoring module being implemented to monitor procurement, deployment, implementation, operation, management, maintenance, or remediation of a particular data center asset at any point in a lifecycle of the data center asset, the management module being implemented to manage procurement, deployment, implementation, operation, monitoring, maintenance, or remediation of the particular data center asset at any point in the lifecycle of the data center asset, the user interface engine being implemented to generate a user interface for the provision, or receipt, of information associated with the monitoring, or management, of the particular data center asset;
identifying an issue within the data center, the issue being associated with an operational situation associated with a particular component of a data center asset of the data center;
generating a remediation task via a data center monitoring and management application executing on the data center monitoring and management console, the remediation task being designed to address the issue within the data center, the remediation task comprising an assignment of a data center remediation operation to a selected data center personnel, the selected data center personnel being selected from a set of available data center personnel, the selected data center personnel being the data center personnel most likely to remediate the issue; and,
performing the data center remediation operation based upon the remediation task, the data center remediation operation being performed by the selected data center personnel.

14. The non-transitory, computer-readable storage medium of claim 13, wherein the computer executable instructions are further configured for:
generating a remediation task priority queue, the remediation task priority queue comprising a plurality of remediation tasks, the remediation task priority queue taking into account at least one of a remediation prioritization and a remediation difficulty.

15. The non-transitory, computer-readable storage medium of claim 14, wherein the computer executable instructions are further configured for:
analyzing the set of available data center personnel;
comparing attributes of the available data center personnel to information associated with the issue; and,
assigning each of the plurality of remediation tasks to at least one of the available data center personnel based upon the comparing attributes of the available data center personnel, the assigning generating an assignment for the at least one of the available data center personnel.

16. The non-transitory, computer-readable storage medium of claim 15, wherein the computer executable instructions are further configured for:
notifying the at least one of the available data center personnel about the assignment; and,
providing a remediation resource regarding the assignment to the at least one of the available data center personnel.

17. The non-transitory, computer-readable storage medium of claim 13, wherein:
the remediation task comprises a solution to address the issue; and,
the solution is distributed to an available data center personnel via the data center monitoring and management application.

18. The non-transitory, computer-readable storage medium of claim 13, wherein:
the data center monitoring and management application facilitates resolution of the data center issue.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *